250/203

United States Patent [19]

Carson

[11] 3,852,714

[45] Dec. 3, 1974

[54] ADAPTIVE IMAGING SYSTEM

[75] Inventor: John C. Carson, Newport Beach, Calif.

[73] Assignee: Eocom Corporation, Newport Beach, Calif.

[22] Filed: June 22, 1972

[21] Appl. No.: 265,144

[52] U.S. Cl. ...... 340/146.3 F, 250/203 R, 250/209, 313/96, 338/17, 340/146.3 MA

[51] Int. Cl. ........ G06k 9/00

[58] Field of Search ........ 338/17, 15, 19; 29/572, 29/577, 589; 343/5 DP, 7.7; 250/220 M, 203 R, 203 CT, 208, 208 X; 339/17 E, 17 M; 313/94, 96; 340/146.3 F, 146.3 MA

[56] References Cited

UNITED STATES PATENTS

| | | | |
|---|---|---|---|
| 3,118,016 | 1/1964 | Stephenson | 339/17 N |
| 3,297,879 | 1/1967 | Meyer | 340/146.3 H |
| 3,330,964 | 7/1967 | Hobrough et al. | 250/203 R |
| 3,351,763 | 11/1967 | Shuart | 250/209 |
| 3,423,589 | 1/1969 | Bardwell et al. | 338/17 |
| 3,564,257 | 2/1971 | Berry et al. | 250/203 R |
| 3,603,688 | 9/1971 | Smith-Vaniz | 250/220 M X |
| 3,714,491 | 1/1973 | McIntyre et al. | 313/96 |
| 3,720,950 | 3/1973 | Vehrs | 343/5 DP |
| 3,727,057 | 4/1973 | Higby et al. | 313/96 |
| 3,748,479 | 7/1973 | LeHovec | 250/208 |

*Primary Examiner*—Gareth D. Shaw
*Assistant Examiner*—Leo H. Boudreau
*Attorney, Agent, or Firm*—Lyon & Lyon

[57] ABSTRACT

An adaptive imaging system is described incorporating: a two dimensional electro-optical detector array with as many as one hundred million detectors; a time-sharing multiplexer which samples each preamplified detector signal; an A/D converter and digital filter; and a computer which generates adaptive control signals to the rest of the system according to criteria observed and recognized by the system. Coupling conductors between detectors and their respective amplifiers are three-dimensionally packaged on multilayered modules. An algorithm, incorporating coincidence logic, for directing and controlling the data processing of the system is described.

12 Claims, 26 Drawing Figures

ADAPTIVE IMAGING SYSTEM

This invention relates to electro-optical systems generally, and more specifically to adaptive imaging systems. In particular, this invention pertains to apparatus for performing adaptive imaging of scenes which generate optical wavelength radiation.

Optical wavelength radiation is radiation whose wavelength lies in that part of the electromagnetic energy spectrum which includes ultraviolet, visible and infrared radiation.

An adaptive imaging system as used herein and in the claims is a system which provides continuous initial, low-resolution observation of a scene until features of the scene appear that meet recognition criteria, such as patterns, energy levels or types of motion, at which time the response of the system to selected portions of the scene where these features occur are altered to provide high spatial and/or temporal resolution or any other response variation as dictated by the specific application.

The best example of an adaptive imaging system is the eye and brain of a human being. As a person goes about his business, such as walking down the street, he receives many light sensations from an extensive scene. His level of attention to the entire scene is usually low and might be described by psychologists as sufficient to be able to discern important features or events if and when they occur. An important event might be the appearance of a loved one or an attractive item in a store window or an oncoming automobile. When such an event occurs, the person focuses his attention on that event while diminishing his attention still further to other portions of his total scene. Thus, the person can be said to adapt to particular situations. The particular means available to a person to do this is the combination of his eye and his brain and the nerves linking the two. The eye senses incoming information and the brain interprets and recognizes and then sends orders to the eye to focus on certain portions of the scene rather than others. The nerves serve as communication paths between the two.

A man-made adaptive imaging system would have a sensor in place of the eye and a computer in place of the brain. Between the sensor and computer would be devices such as multiplexers and analog-to-digital converters which take the place of the nerves.

It is evident that adaptive imaging systems would be useful where surveillance of a given scene or extraction of information therefrom is desirable but where continuous processing of each resolution element comprising the scene is otherwise impossible because of computational or communicational limitations. Therefore, it is extremely desirable to have an adaptive imaging system which can provide the following: continuous viewing of the total scene; direct, simultaneous, and individual control over each picture element of the scene; and variable, patterned responses to several areas of each scene simultaneously.

Ideally, such a system would be able to provide pattern recognition, multiple target detection, and simultaneous tracking, motion detection, and high-fidelity image production and processing. By way of specific example, such a system would be able to perform simultaneous detection and tracking of many aircraft against a sunlit cloud and earth background. The system would be prepared to recognize the presence of aircraft when and where they appeared, and it would track and identify only those portions of the scene where they did appear. A more sophisticated system could be made to recognize only certain aircraft which conform to a restricted set of criteria to denote, for example, enemy versus friend or warhead versus decoy.

Another use to which adaptive imaging systems can be applied is to print reading where the font or style is unknown and/or specific information is being sought. The system would first sense the font and/or style of print in a gross manner. Based on this information, the sensor would apply certain criteria previously programmed into the system to obtain more detailed information in order to identify the letters and words.

Conventional systems provide some of these features and are generally image tube or opto-mechanically scanned systems incorporating single or multi-element arrays of solid state detectors (hereinafter referred to as line scanners). Image tube systems provide continuous viewing of a scene, however, they cannot exercise simultaneous control of the response of each picture element because the elements are read out serially by an electron beam. Furthermore, these systems suffer from poor picture element isolation, dynamic range limitations and signal-to-noise deficiencies. Imaging systems involving intermediate storage techniques are also limited. They do not provide the facility for controlling the sensing function itself and thus do not achieve the objective of minimizing communicational and computational volume.

Line scanners provide good picture element isolation and wide dynamic range by means of having an amplifier associated with each detector. However, they do not provide continuous viewing and, therefore, cannot exercise simultaneous control over responses to the entire scene without some form of intermediate storage which is generally too extensive and complex to be practical for most applications.

Current attempts to improve upon image tubes and line scanners involve two-dimensional mosaic detector arrays (hereinafter referred to as mosaics). In one class of devices wherein the signal on a mosaic is sampled by an electron beam, the mosaic feature provides element isolation, but the beam read-out precludes individual and simultaneous control in an adaptive sense. In another class of devices, a mosaic diode-and-detector array arranged by rows and columns is used and each detector signal is sampled by connecting the appropriate row and column through an amplifier. Thus, several detectors are serviced by the same amplifier. These devices provide individual access that is limited by poor element isolation resulting from too many detectors being connected simultaneously through one amplifier. Furthermore, individual gain and analog filtering is lacking in these devices which precludes adaptive modification of sensor response and which precludes enhancement of the system signal-to-noise ratio and dynamic range.

Mosaic arrays of detectors using individual amplifiers for each picture element have not been implemented due to the prohibitive cost penalties, large power requirements, and packaging difficulties. Typical scenes contain one million to one hundred million picture elements, while conventional high density detector arrays such as line scanners contain only a few thousand elements.

An adaptive imaging system with a mosaic sensor having an individual amplifier for each of its detector is desirable in order to achieve the adaptive imaging objectives of: (*a*) minimizing the number of detector elements required to continuously cover all of the scene under observation; (*b*) providing a mosaic packaging and fabrication technique permitting a number of detectors in each mosaic array at least equal to the number of picture elements in the scene under observation.

BRIEF DISCUSSION OF PRESENT CONCEPTS

Accordingly, it is an object of this invention to provide a new form of adaptive imaging system.

A further object of this invention is to provide a new adaptive imaging system employing multiplexing and preprocessing techniques.

Another object of the present invention is to provide an adaptive imaging system capable of performing pattern recognition, multiple target detection and tracking, and image processing.

An additional object of this invention is to provide a new form of sensor and manner of analyzing signals therefrom.

It is another object of the present invention to provide an adaptable imaging sensor which continuously transmits sensed information from each element of the scene observed.

Another object of this invention is to provide an adaptable imaging sensor which resolves picture elements in a given scene with a minimum number of detector elements.

A further object of the present invention is to provide an adaptive imaging system whose detecting elements have simultaneously addressable individual amplifier-filter circuits associated therewith.

Yet another object of this invention is to provide an adaptive imaging system whose signal processing electronics and data processing algorithms are capable of extracting information from and adaptively controlling the response of the sensor.

A further object of this invention is to provide a novel form of sensor array.

Still a further object of the present invention is to provide a three-dimensional packaging scheme for packaging coupling conductors in a sensor module containing a mosaic detector array with as many as a million or more detector elements.

These and other objects and advantages of the present invention are made possible by virtue of the several novel concepts presented herein, including a signal processing system, new form of sensor and manner of analysis of signals therefrom, and a new form of detector array forming the sensor.

Briefly, the system aspects involve a multiplexing system for the sensor, along with signal processing and means for enabling adaptive control of the response of the sensor. The sensor may be in the form of a plurality of detectors, each having reticles thereon, arranged in predetermined groups. This physical arrangement, along with the manner of processing signals therefrom, facilitates identification and/or detection of events being sensed. Furthermore, a relatively small sensor having a substantial number of detectors as well as the associated conductors and signal processing components such as amplifiers, may be provided according to the present concepts through a physical arrangement thereof. These concepts allow a scene to be viewed continuously while still allowing individual aspects or portions of the scene to be discerned. Through the foregoing concepts, an adaptive imaging system similar to that possessed by humans can be provided, and with a sensor in the form of a two dimensional array of compact size and high detector density. Thus, these concepts enable such adaptive imaging system to be achieved and include a sensor, in the form of a mosaic, for allowing detection of changes to be readily accomplished and identified in time, as well as enable a sensor of reasonable volume to be provided along with certain associated signal processing circuits for enabling sensor data to be readily handled by the system.

In its simpliest form, an adaptive imaging system according to the present concepts has the capability for pattern recognition, multiple target detection, and image processing including real-time random access and control of the sensor resolution elements comprising the scene at any given time. These desirable properties are made possible through the concepts hereof including a mosaic sensor composed of a two dimensional detector array, each member of which may have associated therewith a separate analog amplifier and filter. The two dimensional mosaic array has detector element spacings small relative to the detector element size, and thus can provide continuous viewing of a given scene. A reticle pattern on each detector further enhances the resolution of the system.

The overall system multiplexes the amplifier outputs of the sensor and transfers these outputs to a signal processing unit which further multiplexes the data and digitizes the same. The signal processing unit may employ a digital filter that permits parallel processing of detector groups and demultiplexing. The signal processor can control the sensor gain and frequency response characteristics such that, for example, only interesting elements of the scene are sensed initially, and further sensing at different frequencies or patterns can be commanded by the processor. This capability is enabled because of the access provided by the amplifier/multiplexer integration with the detector array itself.

The mosaic sensor concepts herein enable greater resolution, element isolation and signal-to-noise performance than prior conventional imaging devices since each detector has its own amplifier and filter. Single or multiple access to each detector at various sampling rates and in variable bandwidths permits adaptive imaging and a degree of signal processing and data storage within the sensor. As an example, consider detection and tracking of an aircraft at a distance among bright clouds or against an earth background. The sensor initially can be set in an a.c.-coupled mode in which only moving objects result in generation of a signal. With this signal detected, the signal processor may then apply a series of tests (such as, amplitude, motion, and so forth) to determine that the detected element was indeed an aircraft, and then can direct the sensor to provide a higher sampling rate or resolution to perform the tracking function which can then be carried out on a number of aircraft simultaneously. Thus, because the total scene is not sampled at high rates at once, the computational accuracy of the system is not saturated by unwanted data and can be reserved for just the primary or desired function.

Other features of the system and the concepts herein include applicability with a wide variety of detector materials and the ability to operate simultaneously or separately in more than one wavelength interval. Applications include area surveillance, intrusion detection, print reading, pattern recognition, and computer preprocessors.

DETAILED DISCUSSION OF EXEMPLARY EMBODIMENTS OF PRESENT CONCEPTS

The foregoing and other objects and features of the present invention may be provided by an exemplary embodiment of an adaptive imaging system according to the present concepts, and comprising as a sensing input a two-dimensional array of electro-optical detector elements coupled to a series of amplifier-filter circuits, each detector being coupled to a separate circuit. A sampling system comprising first and second sets of multiplexers are coupled to the circuits so that the signals therefrom can be sampled in an addressably ordered manner. Each first multiplexer sequentially samples the signals from several circuits, and each second multiplexer sequentially samples the signals from several first multiplexers.

Coupled to the sampling system is a preprocessor which comprises: an analog-to-digital converter for digitizing the signals received from the multiplexers; a series-parallel filter having two shift registers in series for registering successive signals from a single detector element simultaneously; a differencer coupled in parallel to the two shift registers for receiving the successive signals and measuring the variation or difference therebetween; a comparator coupled to the differencer for comparing the signal variation with established event criteria such as an established threshold. The series-parallel filter and differencer determine the occurrence of events at the detector elements. The preprocessor also comprises circuitry for identifying types of events that have occurred.

Coupled to the preprocessor is a computer which performs various operations including: sorting the types of events occurring; determining whether certain of these events occurring at one of the detectors are related to events occurring at adjacent detectors; evaluating these certain events and identifying targets; comparing the types of events to known tracks; storing various track and target information for reference and furnishing the information to other operations when needed; predicting new tracks and extensions of old ones; generating various adaptive control signals for adaptively controlling the preprocessor, the multiplexers and the amplifier-filter circuits.

When the detector array contains a large number of detector elements, several preprocessors may be required in which case a third multiplexer can be coupled between the preprocessors and the computer. This third multiplexer will slow down the rate at which the data enters the computer, i.e., it buffers the data entering the computer. This buffering enables the computer to process the data more reliably. In the absence of the third multiplexer or if otherwise desirable, the preprocessor can be designed to provide buffering.

Conductive coupling between each detector in the array and its associated amplifier-filter circuit is accomplished by utilizing the dimension perpendicular to the plane of the detectors to package the conductor. In one embodiment, the detector array is disposed on top of a multilayered mesa structure comprised of several boards with conductors extending perpendicularly therethrough to the detectors. The conductors extend down to various layers of the mesa to avoid two-dimensional congestion. The conductors then extend laterally along their respective layers in an organized pattern to terminals disposed along the edges of the various layers. Large scale integration of the amplifier-filter circuits and the first level multiplexers on these layers is possible and often desirable if sufficient area exists.

In another embodiment of the sensor, multilayered boards with conductor patterns printed on each layer are stacked to form a module. The conductors extend perpendicularly to one end surface of the module on which is disposed the detector array. The conductors extend through the multilayered boards in a direction parallel to the plane of the detector array to a board surface where they are coupled to terminals or, if sufficient area exists, to the amplifier-filter circuits integrated thereon by large scale integration techniques.

The invention will now be described in greater detail in conjunction with the following diagrams in which.

Figures 2, 3:
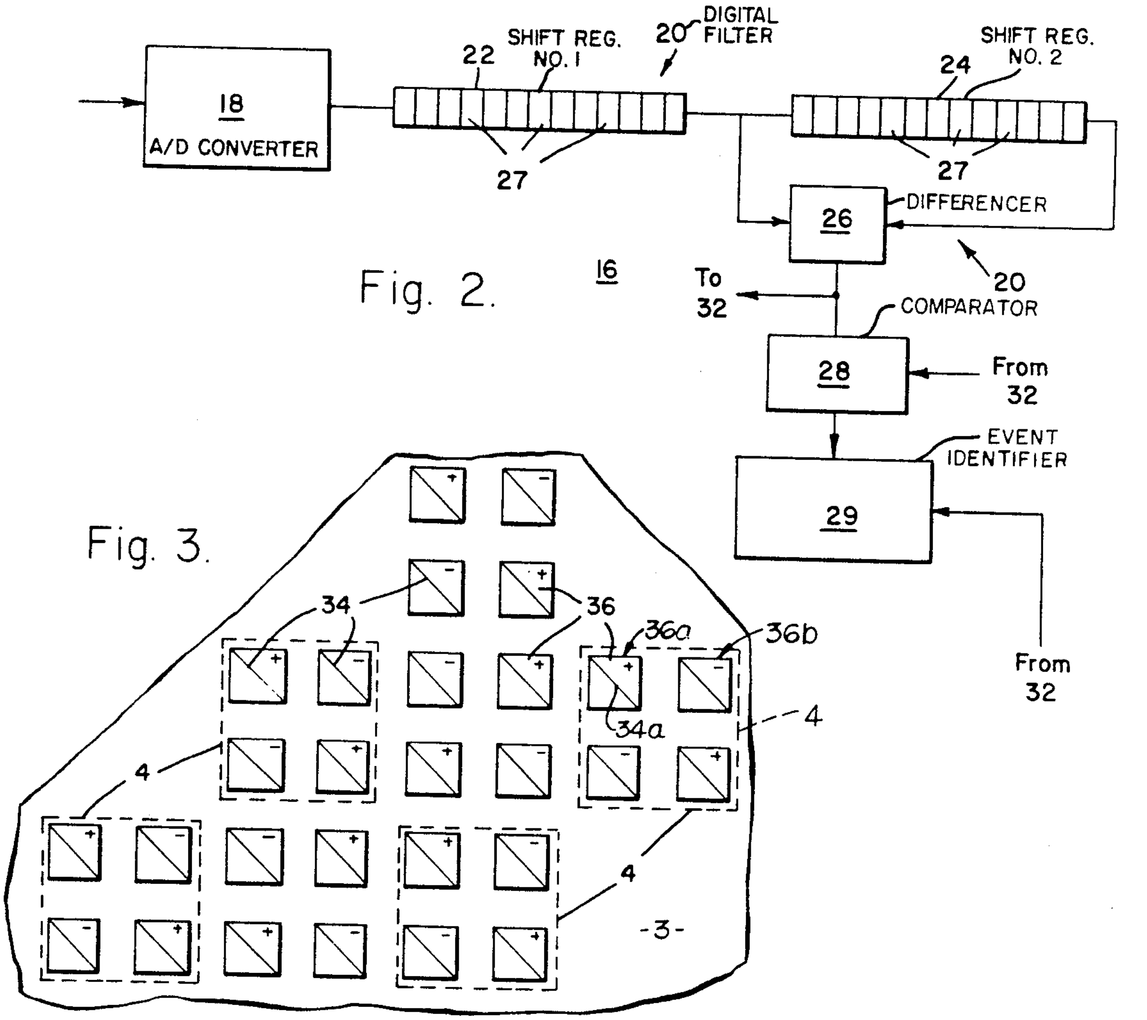
FIG. 2 is a combination logic-flow and schematic block diagram of the preprocessor of FIG. 1.
FIG. 3 is a partial plan view of a typical detector array.
Figures 13, 16:
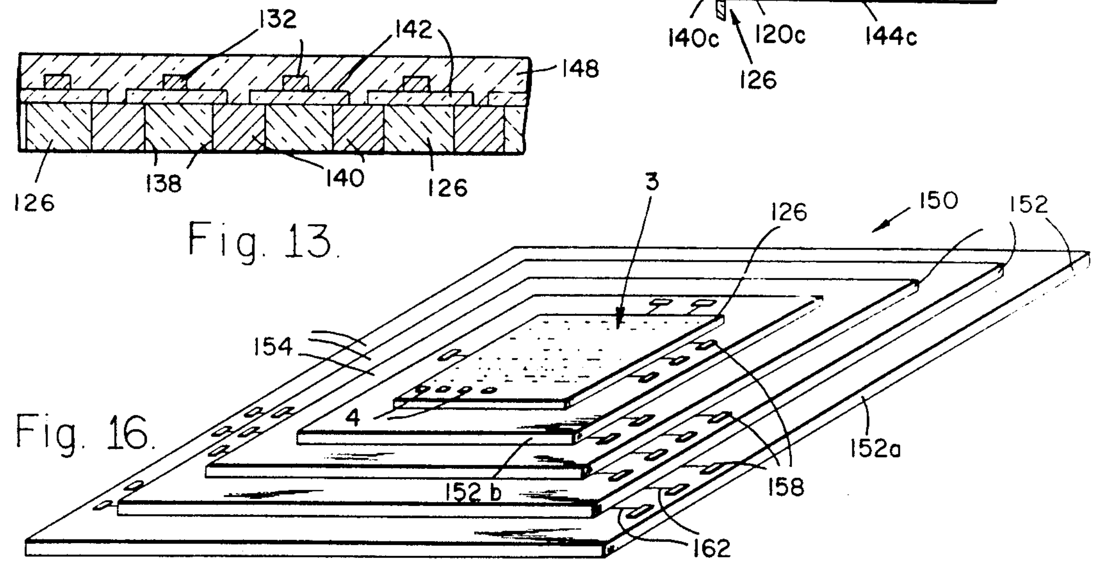
FIG. 16 is a perspective view of another embodiment of the imaging sensor module of this invention.
Figure 19:
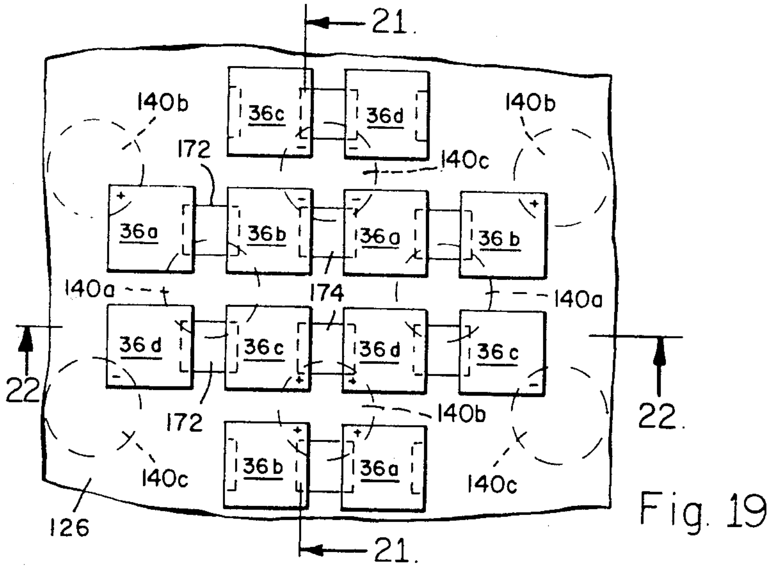
Figure 20:
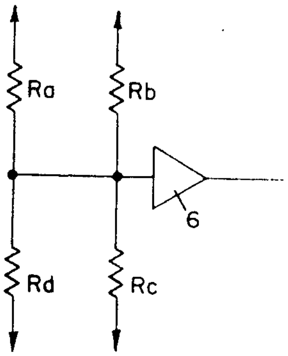
Figure 21:
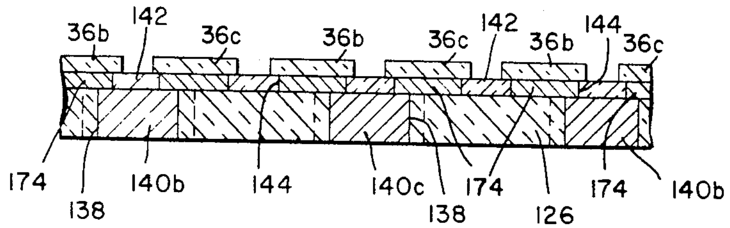
Figure 22:
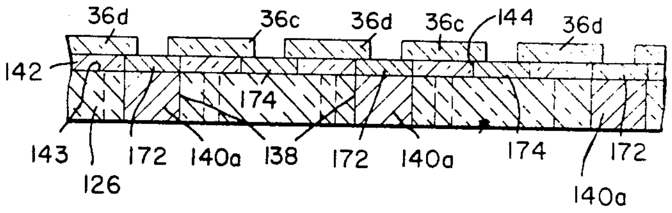
Figure 23:
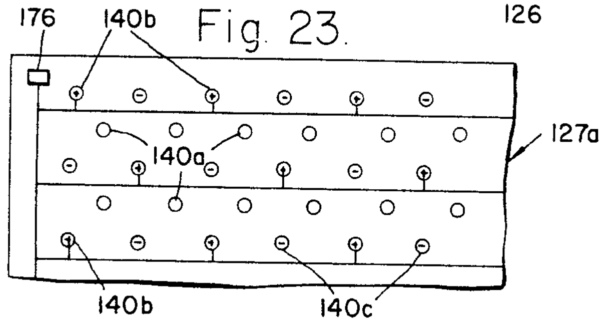
Figure 24:
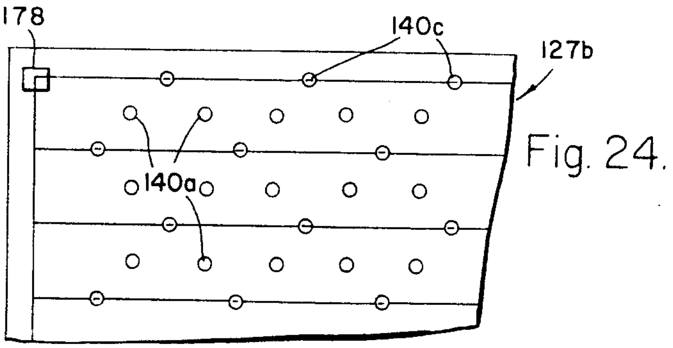
Figure 25:
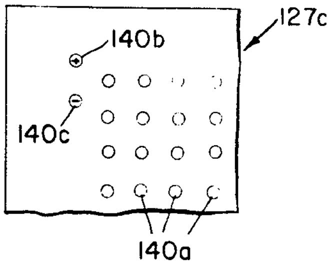

FIGS. **18*a* and 18*b* are plan views of two of the boards of the module of FIG. 16**;

FIG. 19 is a more detailed partial plan view of the detector array of FIG. 3;

FIG. 20 is a schematic representation of a detector of the array shown in FIG. 19;

FIG. 21 is a cross-sectional elevational view of the array of FIG. 19 taken along section 21—21;

FIG. 22 is a cross-sectional elevational view of the array of FIG. 19 taken along section 22—22; and FIGS. 23–25 are partial plan views of substrates used in conjunction with the detector array of FIG. 19.

Figure 1:
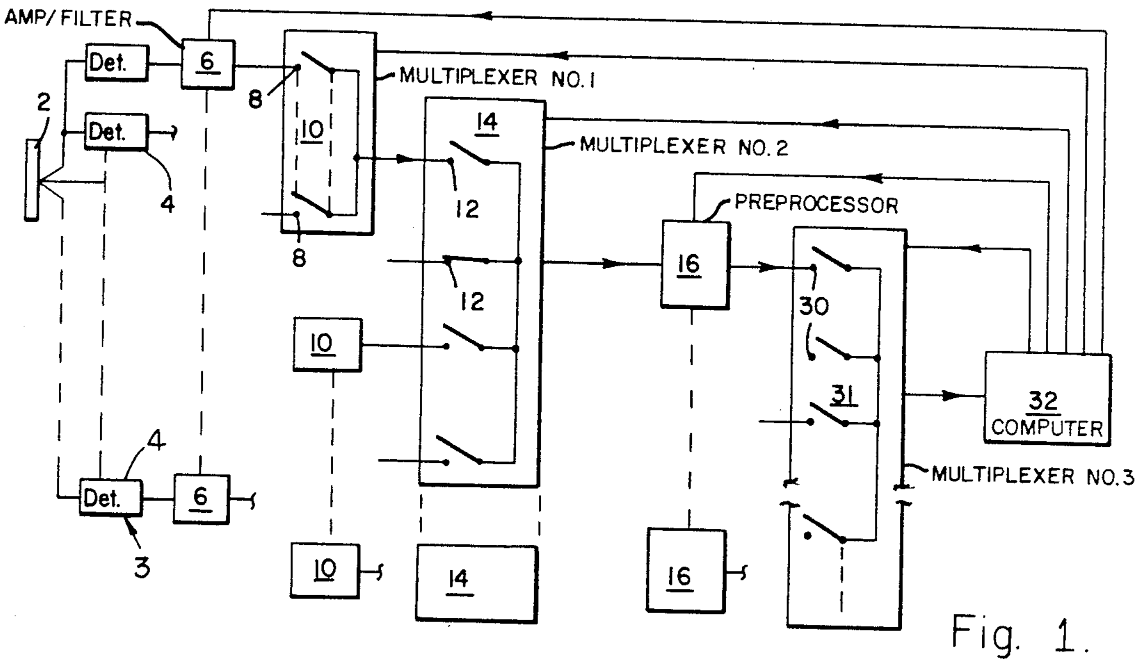
FIG. 1 is a schematic block diagram of the system of this invention.

Referring now to FIG. 1, there is shown a schematic block diagramatic representation of an adaptive imaging system according to one embodiment of the invention. A conventional optical device 2 focuses an image of a scene under observation upon a two-dimensional mosaic array 3 of photosensitive electro-optical detectors 4 which convert the radiation from the scene into electrical signals which represent the scene. Each detector 4 is coupled to a separate amplifier-filter circuit 6 which amplifies and filters the signal from the detectors 4 as desired.

The detectors 4 may be of various semiconductor materials such as lead sulfide, lead selenide, mercury-cadmium-telluride, to name a few. The actual material used depends on such factors as the frequency band of interest and the coefficient of thermal expansion of the substrate supporting the array. Each circuit 6 may be a standard amplifier-filter circuit whose gain and bandwidth are variable and adaptively controllable by another part of the system.

As will be explained in greater detail subsequently, a typical mosaic array 3 of detectors 4 is preferably arranged rectangularly by rows and columns, each detector 4 being essentially rectangular and preferably square, although other shapes and arrangements of the detectors 4 and/or the array 3 which are otherwise compatible with this invention are satisfactory. An array 3 may contain, for example, five hundred and twelve columns and one thousand and twenty-four rows, a total of 524,288 detectors 4 in all. Coupling an individual amplifier-filter circuit 6 to each detector 4 provides preamplification which enhances the signal-to-noise ratio of the system. The method of coupling this many circuits 6, or more, directly to as many detectors 4, or more, is discussed subsequently in greater detail.

Each circuit 6 is coupled to a terminal 8 on a conventional time-sharing first multiplexer 10 which samples the signals from the circuits 6 sequentially. Each multiplexer 10 is coupled to a terminal 12 on a second multiplexer 14 which samples the multiplexed signals from the multiplexers 10. There will be $m$ first multiplexers 10, each coupled to $n$ circuits 6, and $p$ second multiplexers 14, each coupled to $r = m/p$ first multiplexers 10. The sampling rate of the second multiplexers 14 is $r$ times that of the first multiplexers 10. For the aforementioned array of 524,288 detectors 4, a typical first multiplexer 10 samples, for example, the signals from $n$=thirty-two circuits 6, and a typical second multiplexer 14 samples the signals from $r$=sixteen first multiplexers 10. The thirty-two signals sampled by each first multiplexer 10 preferably originate from thirty-two detectors 4 aligned consecutively in a column, and the sixteen multiplexed signals sampled by each second multiplexer 14 preferably comprise samples of signals emanating from sixteen adjacent columns of detectors. Accordingly, the signal from each second multiplexer 14 would, therefore, preferably contain samples from each detector 4 in a rectangular subarray of detectors 4. In general, there would be $n$ $r$ detectors in each subarray. For the aforementioned total number of 524,288 detectors 4, a total of $p = 1024$ second multiplexers 14 and $m = 16,384$ first multiplexers 10 is used. The number of detectors 4 in the array 3 will, of course, effect the number of multiplexers 10 and 14 used. The sampling scheme described is preferred in order to sample and multiplex the signals in an addressably ordered manner, the significance of which is discussed below. However, other sampling schemes which sample the various signals in an addressably ordered manner and are otherwise consistent with the purposes of this invention are also satisfactory. If a greater number of detectors 4 are used, a series of third multiplexers may be desirable after the second multiplexers 14.

The aforementioned preamplification of the signals from the detectors 4 prior to multiplexing is desirable because of the relatively large amplitude of switching noise introduced by the multiplexers 10 and 14. This noise is sufficiently great to render subsequent data reduction extremely difficult and sometimes impossible without preamplification. By preamplifying the signals, the switching noise becomes relatively low with respect to the amplified signal. Having a separate amplifier-filter circuit 6 for each detector 4 eliminates undesirable interference between detector signals and facilitates individual adaptive control of each individual signal.

Each multiplexer 14 is coupled to a preprocessor 16, shown in greater detail in FIG. 2. A preprocessor is defined herein as a data reduction device which determines the existence of an event. Features of a scene are detected by the system by means of the radiation sensing detectors 4, which sense radiation incident thereon. An event is therefore defined herein as a detectable variation in the level of or rate of change of radiation on a detector 4. A variation is detectable if it exceeds a threshold value. If the threshold is zero, the variation is detectable if the signal can be distinguished from the noise present.

Referring now to FIG. 2, the preprocessor 16 is seen to comprise an A/D (analog-to-digital) converter 18 which converts each detector signal sample contained in the signal from the multiplexer 14 into a digital word representing its amplitude. A series-parallel digital filter 20, comprising first and second shift registers 22 and 24, respectively, and a differencer 26, is coupled to the converter 18. The registers 22 and 24 are coupled in series with one another and in parallel to the differencer 26. Each register 22 and 24 is designed to hold one complete frame from a second multiplexer 14 so that each register position 27 corresponds to a known individual detector 4. The digitized signal from the converter 18 is registered in register 22 and in the case of the aforementioned detector array of 524,288 detectors comprises samples of the amplified signals from five hundred and twelve detectors 4. When the next frame of five hundred and twelve samples is registered in register 22, the prior frame is shifted to register 24. The output signals from two registers 22 and 24 in sequence at any instant represent the output signals from one detector 4 on successive first multiplexer 10 samples. The differencer 26 therefore receives two signals in parallel representing two successive signals from one detector 4 and determines the difference between them. In this way, the variation of radiation on each detector 4 is determined. The signal from the differencer 26 is coupled to a comparator 28 which compares it to a threshold value. If the difference signal exceeds the threshold, the variation is discerned, i.e., an event has occurred, and the signal is analyzed further by an event identifier 29 which identifies the type of event indicated by the signal. The time sequence of the samples from the multiplexers is preserved by the preprocessor 16; therefore, the time at which the digital word appears at the preprocessor 16 output determines the address or location in the array 3 of the corresponding detector 4.

Referring once again to FIG. 1, the preprocessors 16 are coupled to a terminal 30 of a third multiplexer 31 which receives signals from the preprocessor 16 at an intermittently high input data rate in parallel and emits them in series at a low continuous data rate, thereby providing a buffer stage for the signals. This buffering could also be accomplished within the preprocessor 16 if desired. The multiplexer 31 is coupled to a computer 32 programmed to examine scene features from each detector 4 and feature patterns from groups of detectors 4 in order to perform a recognition function thereon. In particular, the computer 32 receives signals from the preprocessors which contain information about events and performs processing which includes recognizing, sorting, organizing and classifying the events according to preprogrammed directions. The computer 32 then determines either to disregard the data, to transmit it to a user, and/or to modify or adapt the response or function of each preceding part of the system in order for that preceding part to provide more detailed information of some portion of the scene. The adaptive function can be triggered by the preprocessor 16 upon the occurrence of an event or by the computer 32 upon recognition of the event or of its relationship to other events. When appropriate, the computer 32 may generate adaptive control signals which are coupled back to the circuits 6, the multiplexers 10 and/or 14, and/or the preprocessors 16. For example, a first adaptive control signal may vary the gain and/or bandwidth of a circuit 6, a second adaptive control signal may vary the sampling rate of a multiplexer 10 and/or 14, and a third adaptive control signal may vary the threshold of the comparator 28 or the sampling rate of the buffering multiplexer 31.

Detectors that are large relative to the resolution desired in the image are used in the two-dimensional array 3. Resolution and/or precise location of events in the scene are obtained through a combination of an optical reticle 34, preferably opaque diagonal lines, superimposed over each detector 4, as shown in FIG. 3, and a subdivision of the detectors 4 into electrically and optically discrete quadrants. The electrical bias or polarity on each detector quadrant 36 may, for example, alternate clock-wise from positive to negative with each quadrant 36 having a separate reticle 34.

An instantaneous, low-resolution image is obtained by electrically or optically modulating the electrical signals out of or the optical signals into the detectors 4, respectively. High resolution is obtained by using the reticle 34 to provide spacial modulation. Typical adaptive imaging system operation requires only occasional transmission of the entire image with more frequent scrutiny of any changes in any element of the scene. Therefore, any optical scene modulation is either normally avoided or is filtered by the circuit 6 so that only a moving or changing scene or portion thereof is sensed as discribed subsequently. Once an event has been recognized by the computer 32, high resolution imagery in the region of the scene in the vicinity of the event is then used for further scrutiny. This is accomplished by the aforementioned adaptive control signals. The resolution and/or location accuracy of the system herein disclosed is then only constrained by the optics blur and the signal-to-noise ratio of the system. Moreover, very dim moving objects are easily extracted from much brighter stationary backgrounds by the invention.

Figure 4:
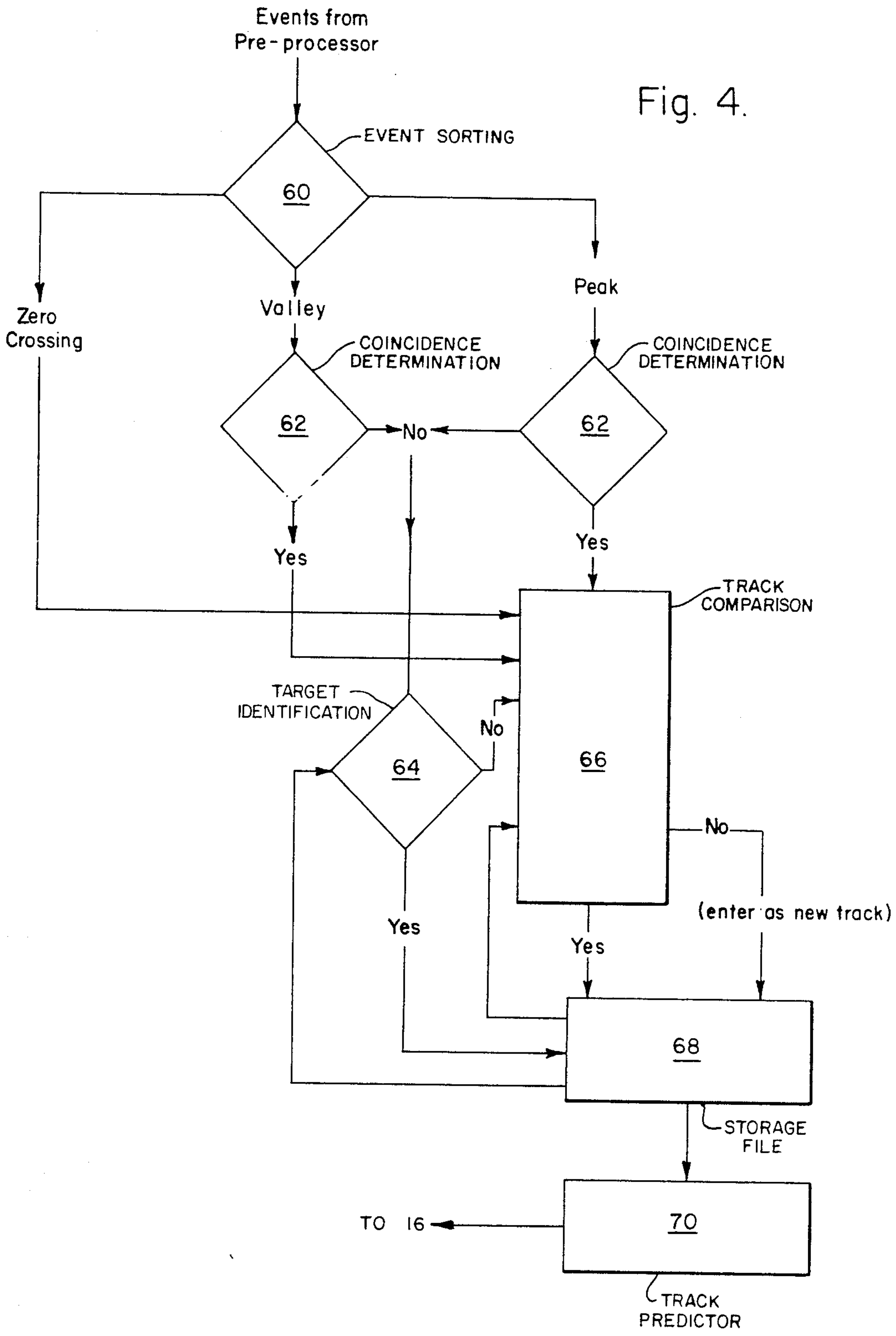
FIG. 4 is a logic-flow block diagram of operations performed by the computer of FIG. 1.

FIG. 4 is a logic-flow diagram describing a computer algorithm incorporated in the computer 32 in one embodiment of this invention which enables the system to perform the desired operations. The algorithm of FIG. 4 will be better understood in conjunction with a discussion of the waveforms of FIG. 5.

Figures 5, 6, 7, 8:
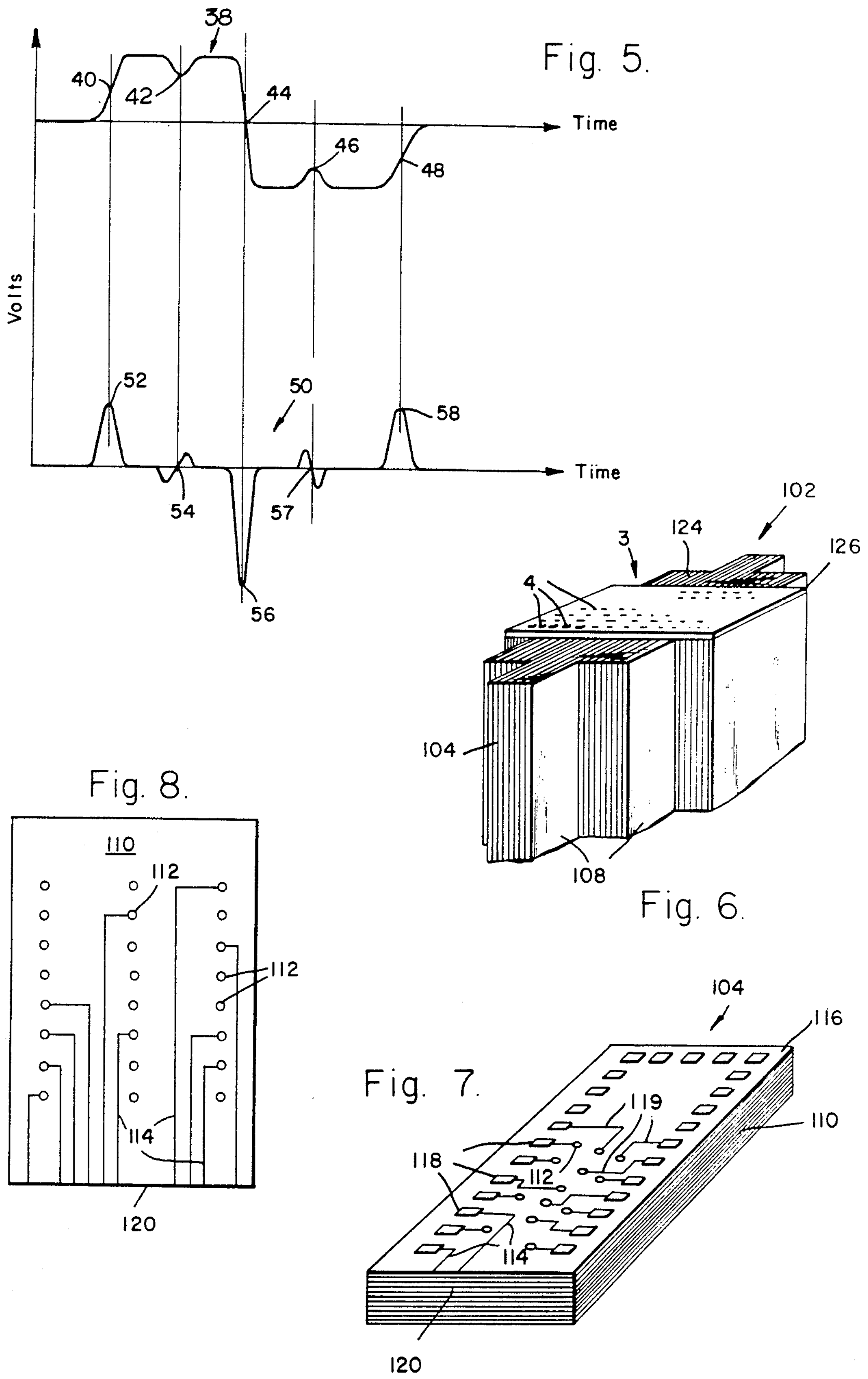
FIG. 5 is a graphic representation of a signal and its derivative from one of the detectors of FIG. 3.
FIG. 6 is a perspective view of one embodiment of the imaging sensor module of this invention.
FIG. 7 is a perspective view of a multilayered board of the module of FIG. 6.
FIG. 8 is a plan view of one of the layers or wafers comprising the board of FIG. 7.

As the image of a bright source of radiation, such as a meteor, crosses the field of view of a detector 4 in the array 3, an electric signal 38, shown in FIG. 5, is generated. The leading edge 40 of the signal 38 represents the entry of the meteor into the field of view of a subdivided detector such as one of those in FIG. 3 where the first quadrant **36*a* is positive and the second quadrant 36*b* is negative. The local minimum 42 in the signal 38 represents the meteor crossing the reticle 34*a* of quadrant 36*a*. The crossover 44 represents the meteor crossing into the second quadrant 36*b* of the detector 4. The local maximum 46 represents the meteor crossing the reticle 34*b* of quadrant 36*b*. The trailing edge 48 of the signal 38 represents the meteor leaving the field of view of the detector 4. The signal 50 represents the rate of change of radiation on the aforementioned detector and is derived by differentiating signal 38**.

Information about the rate of change of incident radiation on a detector 4 is useful and often necessary in ascertaining the action on the scene as will become apparent subsequently.

The signal 50 comprises a first peak 52, a first zero-crossing 54, a valley 56, a second zero-corssing 57, and a second peak 58, which are the derivatives, respectively, of the leading edge 40, the local minimum 42, the crossover 44, the local maximum 46, and the trailing edge 48 of signal 38. Peaks, valleys, and zero-crossings appearing in a differentiated signal 50 signify the occurrence at the detector of various events which, for the purpose of facilitating the discussion herein, will be referred to simply as peaks, valleys, and zero-crossing, respectively.

Referring now to FIG. 4, there is indicated an event sorting operation 60 which sorts the various event signals by type, i.e., peaks, valleys, or zero-crossings. When a peak or valley occurs at a detector, a coincidence determining operation 62 is performed on signals from adjacent detectors to determine whether any related events have occurred thereat. These signals from adjacent detectors are searched by addressing the appropriate multiplexer position and then analyzed. If a related event occurred at an adjacent detector, there is coincidence; if not, no coincidence. An adjacent detector signal can be addressed by the computer 32 via an adaptive control signal coupled back to the appropriate multiplexer 10 or 14. An addressably ordered sampling scheme facilitates searching adjacent detectors. In the case of the aforementioned meteor, when an event occurs on a given detector there will be coincidence because the meteor image is moving across several detectors.

A target identification operation 64 is performed on noncoincident peak and/or valley signals to determine the presence and nature (i.e., stationary or moving) of a target. As defined herein a target is an object or group of objects of interest in the scene causing an event. A track comparison operation 66 compares zero-crossing signals and coincident peak and/or valley signals to known track information. A track is defined herein as a series of related events. A moving target, such as a meteor or an airplane, gives rise to a track while a stationary target such as a fixed spotlight or an erupting volcano does not.

A storage file 68 receives and stores event information from the target identifier 64 and the track comparator 66 and also furnishes information thereto concerning known tracks and stationary targets. The information concerning known tracks comprises established laws of physics governing, for example, radiation from aircraft at specific altitudes and velocities, radiation from meteors, etc. The information concerning known stationary targets comprises geographic locations of valcanoes, airports, stars, etc. If the target identifier 64 determines that a non-coincident event has been caused by a stationary target, this information is stored in the file 68. If the identifier 64 deterines that it has not, the event signal is compared by the comparator 66 to track information stored in the file 68. If the comparator 66 determines that an event fits a known track, it then determines whether that track has previously occurred on the scene. If so, the event information is stored in the file 68 as part of an old track, and if not, as part of a new track.

It is possible for an event to have no coincidence and still fit a track. For example, if the system is airborne and is viewing the earth, aircraft passing therebetween would create a track on the detector array. However, if there were clouds between the system and the aircraft, the radiation from the aircraft might be incident on one detector and not on an adjacent one. Therefore, due to the absence of coincidence, it may appear as though a stationary target caused the radiation at a given detector when in fact a track caused it.

A track predictor 70 receives information from the storage file 68 and uses it to predict new tracks and/or extensions of old tracks. The predictions are coupled back to the preprocessor 16 for correlation with actual signals to determine the accuracy of the predictions. Matched filter techniques are used for correlation purposes to give highly accurate results.

Considering the flight of the meteor once again, as its image crosses the field of view of each detector 4 in its path, an electrical signal similar to signal 38 will be generated and differentiated into a signal similar to signal 50. The duration of the resulting signal will be longer if the image moves diagonally across the detector from corner to corner than if it moves horizontally across or across a smaller portion of the detector. The signal duration gives very little indication of the path of the image across the detector since there are many possible tracks across the detector for any given signal duration.

The reticle 34, an opaque network of lines superimposed over the detectors 4, provides a means for gathering more precise location information about the track. For example, if a zero-crossing occurs in the differentiated signal, the track must have crossed a reticle; if there was a crossover in the electrical signal, the track must lie across two oppositely biased quadrants of the detector. If the path and direction of the image have been determined from coincidence logic, the image location and the instants of time it enters and leaves the field of view of the detector can be ascertained with a high degree of accuracy. Several such exact locations are assembled into a track of even greater accuracy as the point-to-point errors are removed by correlating the data with known tracks. Various reticles other than diagonal lines give accurate results for various other scenes. Moving the reticle and the image cyclically through a small, roughly detector-sized repetitive path provides the exact location for all images including stationary ones. Appropriate choice of reticle motion and design will enable various types of targets to be distinguished by the preprocessor rather than by the computer, advantage of which is taken when the adaptive feature of the invention is not required. For example, proper reticles and motions will allow the observer to ignore all objects with variations whose spatial distribution is known a priori and is radically distinct from that of the targets being sought.

The ultimate accuracy in location of the object is obtained after its track, intensity, and velocity have been roughly established by a computer filter that is tightly matched to the now known detector output. The expected signal for each minor change in time of crossing a reticle bar, for example, is cross-correlated with the actual detector signal. The maximum correlation occurs when the predicted signal matches the actual signal, i.e., when the predicted object location is the actual object location.

The computer 32 may be a general purpose computer or a special purpose computer designed for use in an adaptive imaging system, but in either case it must be such that it can be programmed to perform the algorithm of the invention as shown in FIG. 4. The optical system used to provide the image of the scene to the detector array may be one of many that are standard within the art and is chosen to provide the best light gathering power and spatial resolution, the latter quantity not being directly affected by detector size. The surface of the mosaic array of this invention can be made to conform to the focal surface of the optical system and can accommodate curved images thereby, whereas conventional devices must use some type of image flattening mechanism which limits the optical response of the system. Characteristics of the optical system which tend to cause a blur can be compensated for by the preprocessor 16 as can the detector dynamics and the finite target size.

The method for coupling millions of detectors 4 of a two-dimensional array 3 to individual amplifier-filter circuits 6 prior to multiplexing the signals therefrom entails the three-dimensional packaging of large numbers of coupling conductors in accordance with the techniques hereinafter explained in conjunction with FIGS. 6–25.

Referring now to FIG. 6, there is shown a sensor module 102, according to one embodiment of the invention, comprising a set of multilayered boards 104 of varied widths stacked to form a shelved structure with multiple shelves 108. Each board 104 is comprised of uniform wafers 110 stacked together as shown in FIG. 7. Each wafer 110 has a pattern of metalized holes 112 therethrough and a pattern of electrical conductors 114 thereon as shown in FIG. 8. Each board 104 also comprises a top wafer 116, the edges of which comprise the shelves 108. Each wafer 116 has a pattern of holes 112 therethrough, a series of terminal pads 118 along its shelves 108, and conductors 119 each coupled between a hole 112 and a pad 118 thereon. The conductors 114 on each wafer 110 extend from and in a plane essentially perpendicular to that of an end 120 thereof to the various metalized holes 112 therethrough. Each wafer 116 also has a series of conductors 114 extending from an end 120 thereof to those terminal pads 118 thereon not coupled to any holes 112 therethrough. The wafers 110 are stacked such that the various holes 112 of each wafer 110 are aligned with the holes 112 of the wafers 110 above and below, whereby the metal in the aligned holes 112 form electrically conducting vias 122, shown in FIG. 15 essentially perpendicular to the wafers 110 and 116 and discussed in more detail subsequently. Each via 122 connects a conductor 114 on a wafer 110 to a conductor 119 on the top wafer 116 of its board 104. The wafers are preferably of alumina and the conductors and vias are preferably of gold or aluminum.

Figure 9:
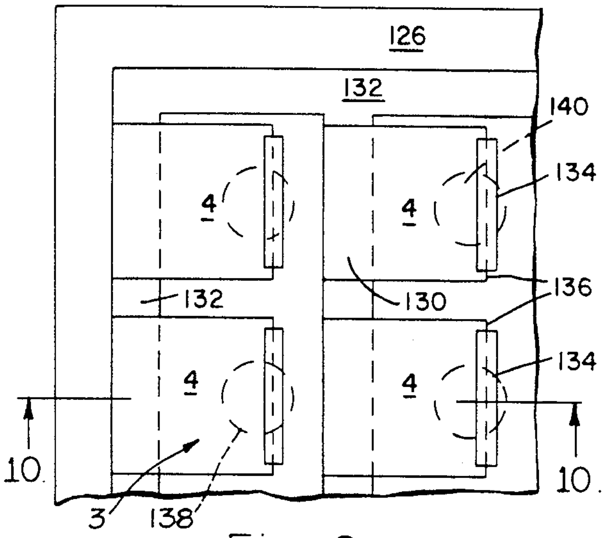
FIG. 9 is a partial plan view of another typical detector array.
Figure 10:
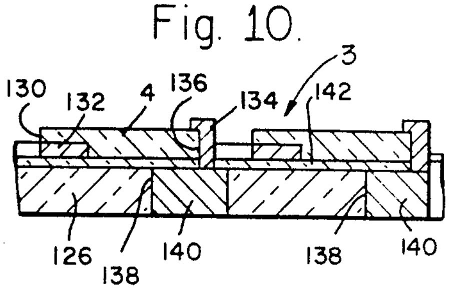
FIG. 10 is a cross-sectional view of the array of FIG. 9 taken along section 10—10.

The module 102 further comprises an essentially flat end surface 124, formed by aligning the ends 120 of the various wafers 110 and 116 in a common plane in order to receive a substrate 126, which is bonded thereto. The substrate 126, shown in greater detail in FIGS. 9 and 10, is preferably of alumina or sapphire and has disposed thereon a mosaic array 3 of the electro-optical detectors 4. Each detector 4 is connected at one end 130 to a common reference terminal 132 and has a signal terminal 134 connected to its other end 136. The terminals 132 and 134 are preferably of gold or indium but may be of other material which forms a secure electrical contact with the detector 4. The substrate 126 further comprises a pattern of holes 138 therethrough with metal dots 140 therein such that each signal terminal 134 contacts a dot 140. The metal dots 140 in the holes 138 could, if desired, be an extension of the signal terminal 134 although separate metalization of the holes 138 is easier to accomplish. The substrate 126 is aligned on the end surface 124 such that the metal dots 140 in each hole 138 contacts a conductor 114. As a result, each detector 4 is coupled to a pad 118.

Figure 14:
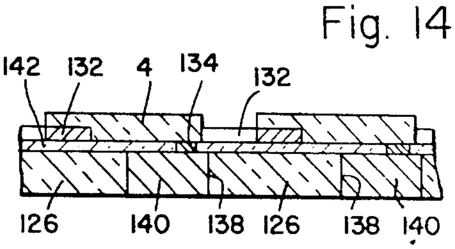
FIG. 14 is a cross-sectional elevational view of an alternative version of the array shown in FIG. 10.
Figure 11:
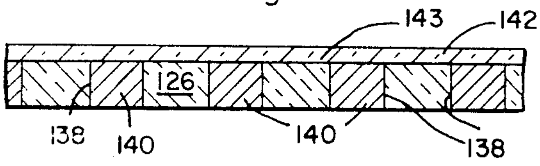
FIGS. 11–13 are cross-sectional elevational views of developmental stages in the manufacture of the array of FIG. 9.
Figure 12:
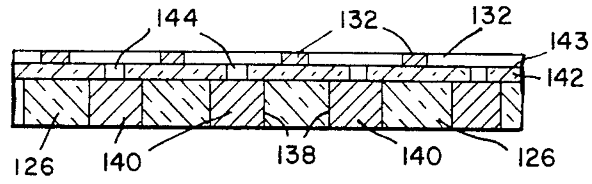

The array 3 of detectors 4 may be formed as follows. The substrate 126 is stamped by a hole punch, or in any other convenient manner, to form the holes 138 in an essentially rectangular pattern. If the array 3 is other than rectangular, the pattern of holes 138 will be formed accordingly. These holes 138 are filled with metal, preferably gold or aluminum, to form the dots 140 and an insulating layer 142 of conventional photoresistive material is deposited on the upper surface 143 of the substrate 126 as shown in FIG. 11. The layer 142 is masked and etched in a conventional manner to form holes 144 therethrough, each hole 144 being above a hole 138 in the substrate 126, as shown in FIG. 12. The common reference terminal 132 is formed on the layer 142. A layer 148 of electro-optically sensitive material such as lead sulfide, lead selenide, or mercury-cadmium-telluride, for example, is then formed over layer 142, terminal 132 and holes 144 as shown in FIG. 13. The layer 148 is masked and etched to form detectors 4 and to expose the conductor 140 beneath the holes 144. Alternatively, the detectors could be formed by laser cutting. The signal terminals 134 are then formed in the holes 144 and in contact with the detectors 4 and metal dots 140, as shown in FIG. 10. An alternative method of forming the detector array would be to form the signal terminals 134 before depositing the layer 148 so that the detectors 4 are formed over the signal terminals 134, as shown in FIG. 14.

Figure 15:
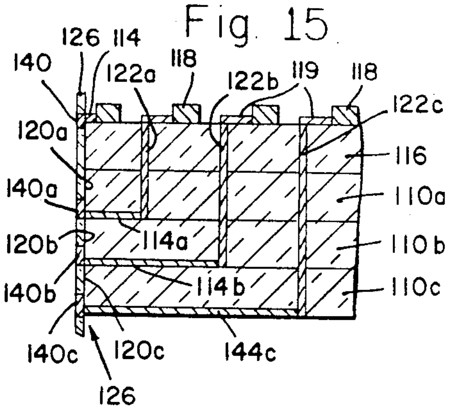
FIG. 15 is a partial cross-sectional view of the board of FIG. 7.

Referring now to FIG. 15, it is seen that not all the vias 122 extend through all the wafers 110 in a given board 104. For example, vias **122*a* coupled to conductors 114*a* which are coupled to dots 140*a* disposed above the end 120*a* of the first wafer 110*a* extend only through the top wafer 116 and the first wafer 110*a*, whereas vias 122*b* coupled to conductors 114*b* which are coupled to dots 140*b* disposed above the end 120*b* of the second wafer 110*b* extend through wafer 110*b* as well. The conductors 114 appear on the bottom of their respective wafers 110 in FIG. 15 for greater clarity of description but are preferably disposed on top. The extent of each via 122 thus depends on the position of the conductor 114 and, consequently, that of the dot 140 to which it is coupled. Accordingly, each wafer 110 of a given board 104 will have more holes 122 therethrough than the wafer therebeneath. By staggering the lengths of the vias 122 in this manner, the necessary coupling between the buried conductors 114 and the externally accessible pads 118** is accomplished.

Figure 17:
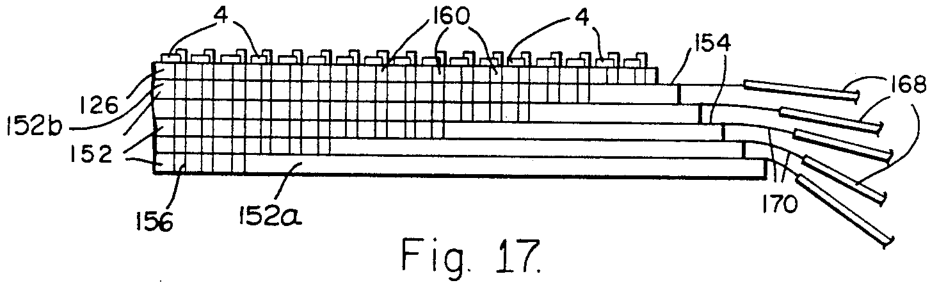
FIG. 17 is a cross-sectional elevational view of the module of FIG. 16.

In FIG. 16 there is shown another imaging module 150, according to a second embodiment of this invention, comprising a set of various sized wafers 152 stacked to form a mesa structure with the edges of the wafers 152 comprising shelves 154. Each wafer 152 has a pattern of metalized holes 156 therethrough (shown in FIG. 18 subsequently) and a series of terminal pads 158 along the shelves 154. The hole patterns in the wafers 152 are such that when the wafers 152 are stacked as shown, the metalized holes 156 are aligned to form electrically conducting vias 160 as shown in FIG. 17. The lowermost wafer **152*a* will have the least number of holes 156 in its hole pattern, while the uppermost wafer 152*b* will have the most. Each wafer 152 will have thereon a pattern of conductors 162, shown in FIGS. 18*a* and 18*b* and discussed in greater detail below, such that each conductor 162 couples a via 160 to a pad 158. Each via 160 thus extends from the uppermost wafer 152*b* to a conductor 162 on a lower wafer 152. The wafers are preferably of alumina or sapphire, and the conductors and vias are preferably of gold or aluminum. The substrate 126 is bonded to the uppermost wafer 152*b* as shown so that the dot 140 in the hole 138 under each detector 4 is coupled to a via 160**.

The modules 102 and 150 may comprise identical detector arrays 3, however, they incorporate mutually distinguishable coupling schemes for coupling the detectors to terminal pads 118 and 158, respectively. In module 150 the wafers 152 are oriented parallel to the substrate 126, whereas in module 102 the wafers 110 and 116 are oriented perpendicularly thereto. The vias 160 of module 150 are in direct contact with the dots 140 of substrate 126, whereas the vias 122 of module 102 are coupled thereto by coupling conductors 114. The resulting congestion of vias 160 and conductors 162 on wafers 152 is greater than that of conductors 114 and 119 and vias 122 on wafers 110 and 116, rendering module 150 perhaps more difficult and expensive to construct than module 102. However, module 150 can be made approximately half the size of the most compact module 102 for a given detector array.

The logistic arrangement of conductors 114 and 119 on wafers 110 and 116 is relatively straightforward, as has been previously discussed. The logistic arrangement of conductors 162 on wafers 152, shown in detail in FIGS. **18*a* and 18*b*, on the other hand, is more complex because for the same size detector array there will be appreciably less wafers 152 in module 150 than wafers 110 and 116 in module 102**.

Figure 18A:
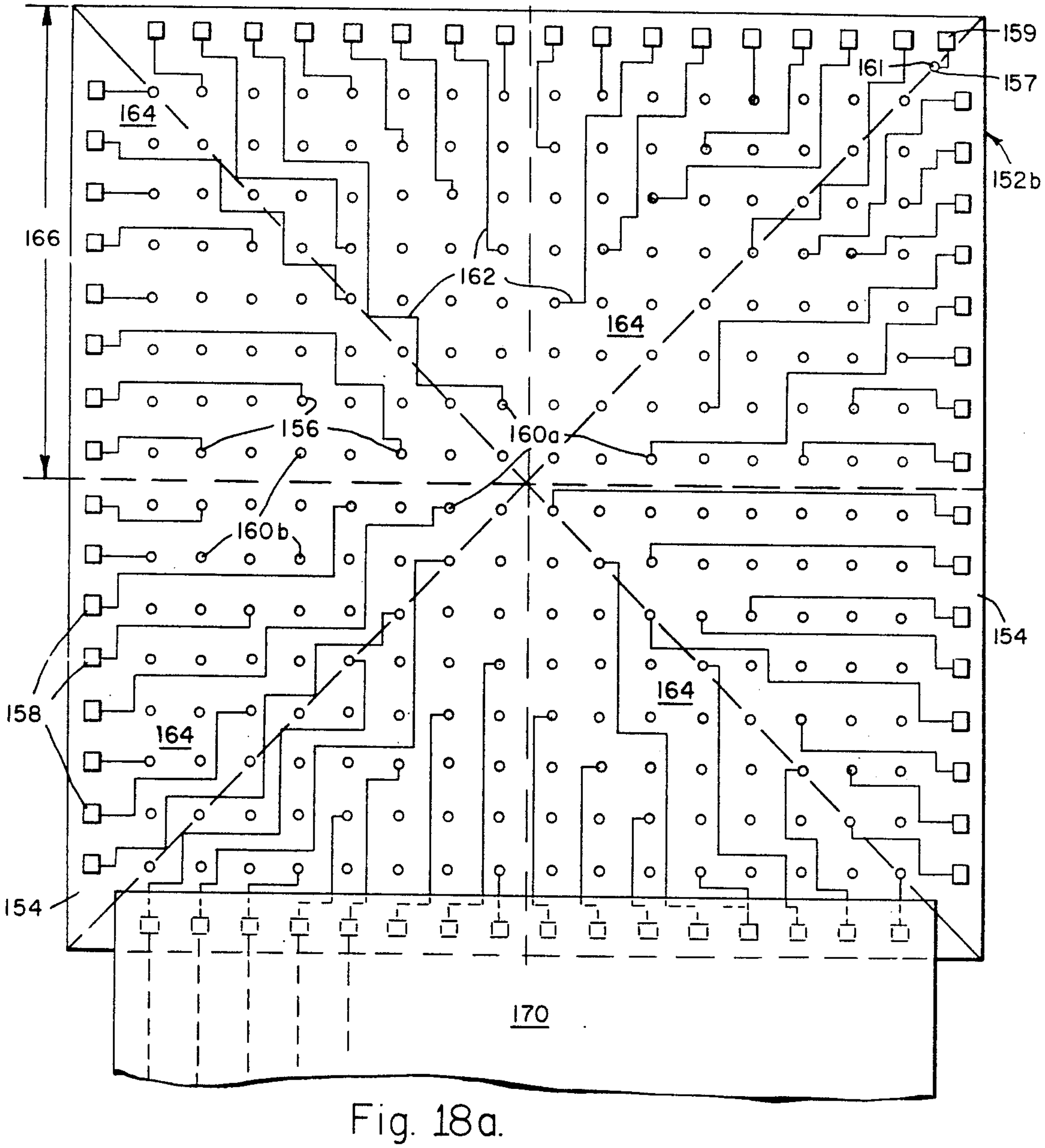
Figure 18B:
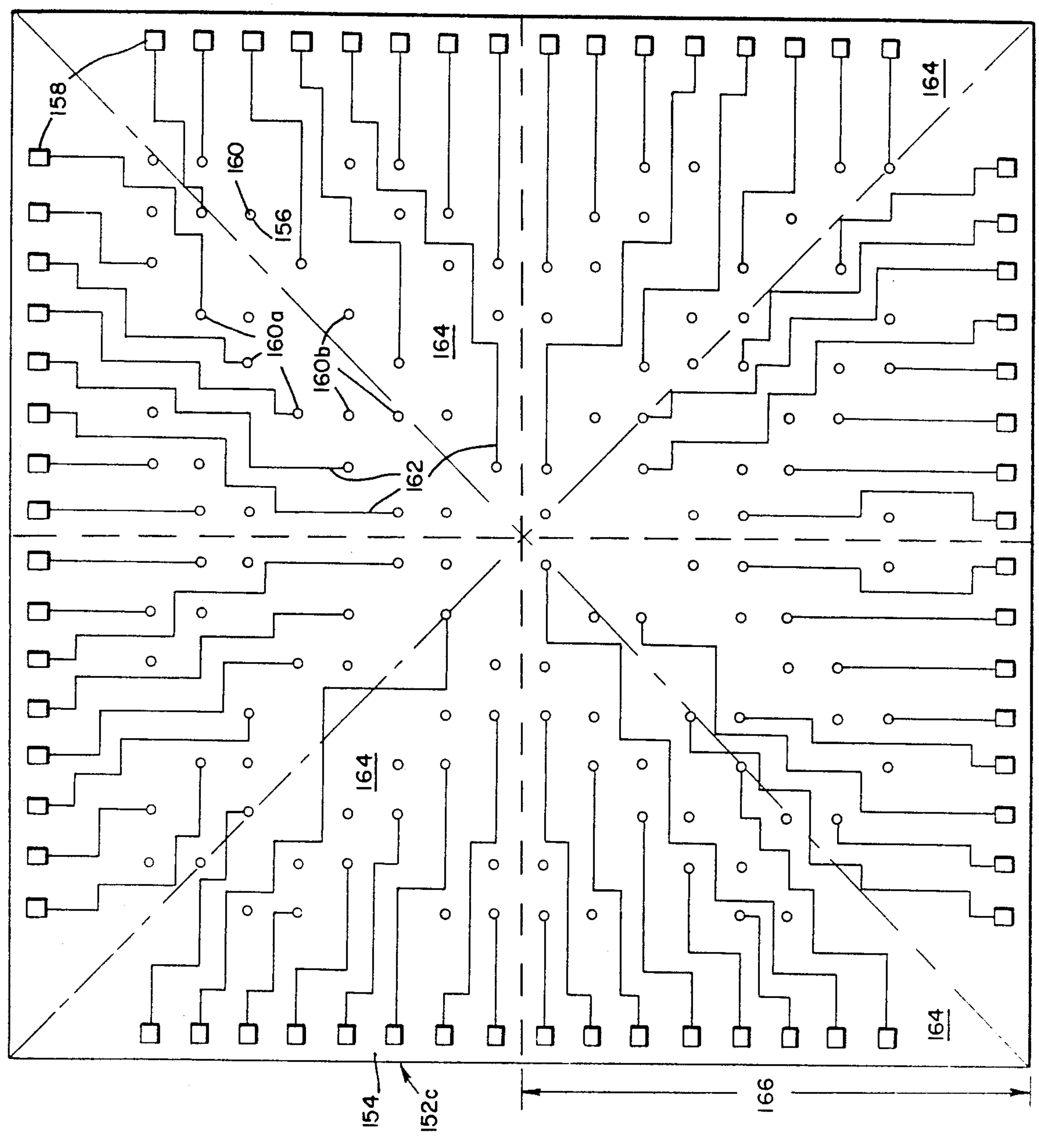

Referring now to FIGS. 18*a* and 18*b*, there is shown a logistic arrangement of conductors 162 on wafers 152*b* and 152*c*, respectively, wafer 152*c* being a representative intermediary wafer stacked between wafers 152*a* and 152*b*. The logistic arrangement shown therein provides coupling between terminal pads 158 and the detectors 4 of a square mosaic array of sixteen by sixteen detectors. A square rather than a rectangular array is considered because the logistic complexity associated with coupling detectors 4 to terminal pads 158 is greater for a square array. The geometry of the wafers 152 will generally conform to that of the array 3, therefore, the wafers 152*b* and 152*c* are shown square. The wafer 152*b* in FIG. 18*a* has a pattern of holes 156 therethrough with as many holes 156 as detectors 4. An extra via 161 is provided in an extra hole 157 for coupling the common terminal 132 to a common pad 159. The pattern of conductors 162 thereon is such that one via 160*a* in every four vias is connected to a conductor 162 and terminates at the edge of wafer 152*b*. The other vias 160*b* extend to three lower wafers 152. Via 161 can terminate at wafer 152*b*. In FIG. 18*b* wafer 152*c* has half as many metalized holes 156 therethrough as wafer 152*b*. Wafer 152*c* is the third wafer 152 in the module 150 in this case, therefore one half the detectors 4 are coupled to vias 160 on the two wafers 152 above and one fourth on the wafer 152*a* below, i.e., one fourth the detectors 4 are coupled to vias 160 on each wafer 152 since there are four wafers.

The wafers 152 in FIGS. 18*a* and 18*b* each comprise eight half quadrants 164, figuratively formed by diagonalizing each wafer quadrant. Adjacent the base 166 of each hald-quadrant 164 and along the shelves 154 is disposed a pattern of pads 158. Each half-quadrant 164 has associated with it half the pads 158 disposed on one shelf 154 of the wafer 152, in this case eight pads per half-quadrant or one eighth the total pads 158 on the wafer 152. For routing convenience, all conductors 162 connected to vias 160 in a half-quadrant 164 are coupled to the pads 158 disposed at the base 166 of that half-quadrant 164.

The coupling arrangement shown in FIGS. 18*a* and 18*b* is not the most spatially or volumetrically economical, however, it is descriptive of the manner in which vias 160 in the center of the wafers 152 are coupled to terminal pads 158 on the peripheral shelves 154. By zigzagging as shown, the various conductors 162 avoid crossing paths with one another and each conductor 162 contacts only one via 160 and only one pad 158. If necessary or desirable, the two hundred and fifty-six detectors of the aforementioned array could be accommodated on one wafer 152 with four zigzagging conductors 162 fitting between adjacent vias 160 at the most congested points. This would require two hundred and fifty-six pads 158 per wafer 152 and thus thirty-two pads 158 per quadrant 164. For a square array having a greater number of detectors 4, the density of conductor 162 on a wafer 152 will be greater and/or a greater number of wafers 152 will be required. By way of example, consider a square array containing 1024 square detectors on a side, a total of 1,048,576 detectors, the size of each detector being 4.5 mils on a side. The spacing between detectors may be 0.5 mils, therefore, the width of the array would be 5.120 inches. The holes 138 and 156 may be 3 mils in diameter and spaced 5 mils from center to center, therefore, there would be 2 mils between adjacent holes 138 and between adjacent holes 156, and therefore between adjacent vias 160. Assuming 0.1 mil conductor widths and 0.1 mil minimum spacing between adjacent conductors 162, there could comfortably fit at last eight conductors 162 between adjacent vias 162. The base 166 of each half-quadrant 164 will accommodate 512 vias 160 on the most congested wafer 152*b*. This means 8 × 512 = 4096 conductors 162 per half-quadrant or 8 × 4096 = 32,768 conductors 162 per wafer 152. If the pads 158 are 2 mils wide and spread 0.5 mils apart, each quadrant could have four rows of 1024 pads each on a shelf 154 or 32,768 pads 158 per wafer 152. The total number of conductors divided by the number of conductors per wafer determines the number of wafers to be used, in this case 1,048,576/32,786 or thirty-two wafers 152. If the wafers 152 are 20 mils thick, the module 150 would be 640 mils or .64 inches thick. The volume of module 150 for such an array is, therefore, approximately 17 cubic inches.

By way of comparison for the same array, the module 102 would require wafers 110 and 116 at least 5.12 inches wide along edge 120 and would require 256 total wafers 20 mils thick. Each wafer 110 and 116 could accommodate four rows of detectors or 4096 detectors in all. Thus, 4096 conductors 114 would be on each wafer 110 and 116. Assuming 3 mil thick vias 122 spaced 1 mil apart and assuming 2 mil square terminal pads 118 spaced .2 mils apart, then if the wafers extended 1.13 inches from end 120 and 5.25 inches along end 120, each wafer 116 could accommodate 262,144 pads 118. Therefore, four boards 104 comprising 64 wafers each could accommodate the array of detectors, and the volume module 102 would be about 31 cubic inches. In modules 102 and 150, by making use of the third dimension to couple the detectors 4 to distant terminal pads 118 and 158, respectively, a large two-dimensional array of detectors 4 is rendered accessible for further electrical coupling.

The various dimensions discussed in the foregoing examples are typical for the invention. The minimum values of these various dimensions are determined by the limitations of contemporary miniaturization technology. Generally, the thickness of the wafers 110, 116 and 152 would be at least essentially 10 mils to provide the necessary rigidity and usually no more than essentially 30 mils in order to conserve space, although they may be thicker if desired. The detectors 4 are essentially at least two mils wide and the width of the reticle lines are essentially 0.1 mil. The vias 122 and 160 are essentially at least 2 mils thick spaced essentially 0.5 mils or more apart. The pads 118 and 158 are essentially at least 1 mil wide and the conductors 114, 119 and 162 are at least essentially 0.1 mil thick and spaced 0.1 mil apart.

The amplifier circuits 6 of FIG. 1 are coupled to the terminal pads 158 of module 150 or pads 118 of module 102 and can be located on the shelves 154 or 108, if desired. They may also be located on separate circuit boards 168 and coupled to the pads 158 (or 118) by flexible ribbon connectors 170, as shown in FIG. 17.

It will be observed from the foregoing that the number of detectors 4 in a given array is theoretically unlimited insofar as the system itself is concerned. Any number of detectors may be coupled to an equal number of amplifiers by the method, herein described, of utilizing the dimension normal to the plane of the detectors to stack conductors for distant coupling of the amplifiers. Of course, the greater the number of detectors, the greater will have to be the size of the modules 102 and/or 150. However, their sizes are relatively small for the number of detectors that might be accommodated.

If the amplifier circuits and first level multiplexers are included in the modules in accordance with LSI techniques, the size of the modules might be larger than otherwise in order to accommodate the electronics on the various wafers and boards. Thus, in the previous examples, if surface area required to integrate the circuits 6 and the multiplexers 10 were equal to the surface area used to accommodate the pads 118 and the vias 122 in module 102 or the pads 158 and the vias 160 in module 150, the modules would be double the volume in each case, i.e., the volume of module 102 would be about 62 cubic inches and that of module 150 would be about 34 cubic inches.

As discussed previously, the system precision can be increased by the use of reticles 34 on the detectors 4. These can be formed by masking the detectors and depositing a reticle pattern material which will be opaque to the anticipated incident radiation when the detector array is in actual use. An alternative version to the deposited reticle is a substrate transparent to the anticipated incident radiation, except for reticle lines therein which are opaque. Such a substrate is placed adjacent the detector array so that each detector 4 has an individual reticle 34 to intercept the incident radiation. If desired, this reticle substrate could be moved with respect to the detectors in order to modulate the optical signal.

The aforementioned detector subdivision is shown in greater detail in FIG. 19, wherein is seen a plan view of part of an array 3 of detectors 4 subdivided into quadrants 36 at least essentially 1 mil wide. This subdivision may be achieved by etching or by laser cutting, as previously discussed in connection with manufacturing the array 3. The polarities of the diagonally opposite first and third quadrants 36*a* and 36*c*, respectively, of each detector are the same and are distinct from those of the diagonally opposite second and fourth quadrants 36*b* and 36*d*, respectively, which are also the same. The detectors 4 are arranged such that adjacent quadrants 36 of adjacent detectors 4 have the same polarity. For the purpose of this discussion, the upper left, upper right, lower right and lower left quadrants of each detector 4 will be referred to as the first, second, third and fourth quadrants, 36*a*, 36*b*, 36*c* and 36*d*, respectively.

Each quadrant has a signal terminal 172 and a bias terminal 174 disposed at opposite sides thereof to provide a uniform electric field thereacross. Each signal terminal 172 is shown in contact with two quadrants of the same detector, although either a separate terminal 172 for each quadrant or one terminal 172 for all four quadrants of each detector 4 is satisfactory. Each terminal 174 contacts two adjacent quadrants of two adjacent detectors, although either a separate terminal 174 for each quadrant or one terminal 174 for each four adjacent quadrants of each four adjacent detectors is satisfactory. Thus, in FIG. 19 first and second quadrants 36*a* and 36*b* of the same detector are coupled to the same signal terminal 172, and fourth and third quadrants 36*d* and 36*c* are coupled to another signal terminal 172. Similarly, each pair of adjacent quadrants of adjacent detectors (e.g., 36*b* and 36*a*; 36*c* and 36*d*) are coupled to a bias terminal 174. Each detector 4 is disposed above a metal dot 140 so that the signal terminal or terminals 172 associated with the four quadrants of each detector 4 contact the same signal dot 140*a*. The detectors 4 are further disposed so that the corners of four mutually adjacent quadrants 36 of four mutually adjacent detectors 4 lie above either a positive bias dot 140*b* or a negative bias dot 140*c*. The bias terminal or terminals 174 associated with each four adjacent quadrants 36 of each four adjacent detectors 4 contact one bias dot 140*b* or 140*c* to provide the same bias to each of these four adjacent quadrants.

Each subdivided detector 4 can be represented schematically in the manner shown in FIG. 20 wherein the quadrants 36*a*, 36*b*, 36*c* and 36*d* are represented by resistances R*a*, R*b*, R*c* and R*d*, respectively. Subdivision of the detectors into uniform quadrants is preferable, in which case the aforementioned resistances are essentially equal.

The array of subdivided detectors 4 are formed as follows. The substrate 126 is stamped to form holes 138 which are metalized to form metal dots 140, as before, and an insulating layer 142 is deposited thereover on the substrate surface 143, as shown in FIG. 11. The layer 142 is masked and a series of holes 144 are etched therein. The terminals 172 and 174 are formed in the holes 144 and in contact with the appropriate dots 140 according to the pattern shown in FIG. 19. A layer of electro-optical material is disposed thereover and then masked and etched or cut by a laser to form the quadrants 36 of the subdivided detectors 4, as shown in FIGS. 21 and 22. The array of subdivided detectors 4 could also be formed by first forming the detector quadrants 36 and then forming the terminals 172 and 174, if desired. The terminals would then contact the detector quadrants 36 at their sides instead of from underneath as in FIGS. 21 and 22.

In order to provide the necessary bias potentials to the subdivided detectors in the mesa module 150, two extra substrates 127*a* and 127*b* essentially equal in size are used. These substrates 127*a* and 127*b*, representative portions of which are shown in FIGS. 23 and 24, respectively, are at least as large as substrate 126 but no larger than wafer 152*b*. For a rectangular array of $x$ by $y$ detectors, there will be $xy$ signal dots 140*a*, $xy/2 + x + y$ positive bias dots 140*b*, and $xy/2 + x + y$ negative bias dots 140*c*, a total of $2xy + 2(x + y)$ dots in all. Substrate 127*a* is positioned directly beneath the substrate 126 and has the same number of metal dots 140 therethrough as the substrate 126, to wit, $2xy + 2(x + y)$. The substrate 127*a* is aligned so that each of its dots 140 contacts a dot 140 directly above. There are $xy + x + y$ dots 140*b* of substrate 127*a* which contact the positive bias dots 140*b* of substrate 126 and they are coupled together by an appropriate conductor pattern on substrate 127*a* to a positive bias terminal pad 176 as shown in FIG. 23. The pad 176 may be disposed on wafer 152*b*, if desired, and is ultimately coupled by a ribbon connector 170 to an external positive bias source.

Substrate 127*b* is positioned between substrate 127*a* and wafer 152*b* and has $3xy/2 + x + y$ dots 140 therethrough. There are $xy + x + y$ dots 140*c* of substrate 127*b* which contact negative bias dots 140*c* of substrates 127*a* and 126 and they are coupled together by an appropriate conductor pattern to a negative bias terminal pad 178 as shown in FIG. 24. The pad 178 may also be disposed on wafer 152*b*, if desired, and is ultimately coupled by a ribbon connector 170 to an external negative bias source. Wafer 152*b* has *xy* vias therethrough, which contact signal dots 140*a* of substrates 127*b*, 127*a* and 126, *x* signifying the number of vias along the length of the wafer 152*b* and *y* signifying the number along the width.

The necessary bias potentials for the subdivided detectors used on the module 102 can be readily provided essentially in the same manner as for the mesa module 150. The substrates 127*a* and 127*b* are now the same size as the substrate 126, and a third substrate 127*c* shown in FIG. 25, also the same size as the substrate 126, is positioned between the substrate 127*b* and the end surface 124. Substrate 127*c* has $xy + 2$ dots 140, *xy* dots 140*a* of which couple signal dots 140*a* of the substrates 127*b*, 127*a* and 126 to conductors 114 as discussed earlier. One dot 140*b* of the other two dots 140 of substrate 127*c* couples the positive bias dots 140*b* of the substrates 127*b*, 127*a* and 126 to a conductor 114 coupled to an external source of positive bias potential, substrate 127*b* having only one positive bias dot 140*b*. The second dot 140*c* of the other dots 140 couples the negative bias dots 140*c* of the substrates 127*b*, 127*a* and 126 to a conductor 114 coupled to an external source of negative bias potential. Accordingly, substrate 127*b* will have an extra dot 140 when used with module 102 in order to couple the commonly connected bias dots 140*c* of substrate 127*c* to the appropriate extra dot 140*c* on substrate 127*c*.

The third substrate 127*c* can be dispensed with, if desired, in which case the positive bias dot 140*b* of substrate 127 coupled the positive bias dots 140*b* of substrates 127*a* and 126 to the conductor 114 coupled to the source of positive bias potential, and any one of the negative bias dots 140*c* of substrate 127*b* couples the other negative bias dots of substrates 127*b*, 127*a* and 126 to the conductor 114 coupled to the source of negative bias potential. By using the third substrate 127*c*, all but two bias dots are insulated from the end surface 124, resulting reduced congestion of conductors 114 between dots 140.

It will be understood from the foregoing that the number of detectors 4 that can be accomodated by the system of this invention is limited by practical considerations such as the volume of space in which the sensor module will be housed, the physical location of the module, etc. A square array of $10^{12}$ detectors, each 4 mils wide, would require a square area $4 \times 10^3$ inches on each side, approximately the area of two football fields. While such a size is possible, it is impractical for the most part. However, a square array of $10^8$ detectors of the same size would require an area of approximately one square yard, a size that could be readily constructed and easily handled.

There has thus been shown and described an adaptive imaging system using millions of detector elements three-dimensionally coupled to separate amplifier-filter circuits for adaptively controllable preamplification and filtering of the detector signals prior to sampling and data reduction according to an adaptively controllable coincidence logic algorithm.

Although specific embodiments of the invention have been described in detail, other variations of the embodiments shown may be made within the spirit, scope and contemplation of the invention.

Accordingly, it is intended that the foregoing disclosure and drawings shall be considered only as illustrations of the principles of this invention and are not to be construed in a limiting sense.

What is claimed is:

1. A sensor module comprising:

a plurality of electro-optical detector elements arranged in a two-dimensional array, each of said detector elements being divided into four electrically and optically distinct quadrants with the adjacent quadrants of each detector element being differently biased for enabling such adjacent quadrant to provide electrically different signals in response to radiation moving relative to such adjacent quadrants, and each quadrant having a reticle optically associated therewith, common amplifier means operatively associated with the four quadrants of each said detector element, and circuit means coupled with the amplifier means of each detector element for detecting variations in signals from said detector elements as a function of radiation passing the reticle of a quadrant and as a function of radiation passing from quadrant to quadrant of a detector element.

2. A sensor module comprising a plurality of electro-optical detector elements arranged in a two-dimensional array, each of said detector elements being divided into four electrically and optically distinct quadrants, and each quadrant having a reticle optically associated therewith, circuit means for differently biasing adjacent quadrants of each detector element for enabling adjacent quadrants to provide electrically different signals in response to radiation moving relative to such adjacent quadrants, and detector circuit means coupled with said detector elements for analyzing signals therefrom, said detector circuit means comprising means for detecting variations in signals from said detector elements as a function of radiation passing the reticle of a quadrant and passing from quadrant to quadrant of a detector element.

3. An imaging system for providing observation of a scene for recognition of features of a scene, comprising a two dimensional mosaic array of radiation sensitive electro-optical detector elements for converting radiation from a scene into electrical signals representing the scene, each of said detector elements being divided into four electrically and optically distinct quadrants with the adjacent quadrants of each detector element being differently biased for enabling adjacent quadrants to provide electrically different signals in response to radiation moving relative to such adjacent quadrants, and each quadrant having a reticle optically associated therewith for providing spacial modulation to enhance resolution of the scene, multiple circuit means each operatively associated with one of said detector elements for receiving and operating upon the signal emitted by each said element, said multiple circuit means each comprising common amplifier means operatively associated with the four quadrants of each said detector element and an output circuit coupled with the amplifier means of each detector element, sampling means coupled to said multiple circuit means for sequentially sampling the signals from said circuit means, said sampling means comprising multiplex means coupled with the output circuits of the circuit means, and processor means coupled to said sampling means for receiving and processing said sampled signals, said processor means including serially connected storage means for storing sampled signals representing output signals of groups of detectors sampled at different times, and including combining and comparator means connected with said storage means for combining said stored sampled signals and comparing the resultant signals to a threshold signal for detecting the occurrence of features of a scene.

4. The system as claimed in claim 3 wherein said processor means further includes digitizing means for digitizing said sampled signals, and said serially connected storage means stores said digitized signals representing said output signals of groups of detector elements sampled at different times, and said combining and comparator means comprises differencer means coupled with said storage means for receiving in parallel said digitized signals and measuring signal variation therebetween, and includes comparator means responsive thereto for comparing said signal variations with said threshold signal.

5. The system as claimed in claim 3 wherein each said amplifier means comprises an amplifier-filter means for amplifying and filtering the signal emitted by each said detector element, and each amplifier-filter means comprising a separate amplifier-filter circuit coupled between each said detector element and said sampling means.

6. The system as claimed in claim 5 further comprising three-dimensional multiple coupling means associated with said array of detector elements for coupling each said detector element to a said separate amplifier-filter circuit, said multiple coupling means including a set of wafers of varying size stacked to form a mesa structure with shelves, a substrate disposed on said structure and having said detector array disposed thereon, each said detector element being coupled between a common reference terminal and an individual signal terminal, multiple coupling terminals disposed on said shelves, and conductive means three-dimensionally associated with said wafers for coupling said common terminal and each said signal terminal to a separate one of said coupling terminals.

7. The system as claimed in claim 5 further comprising three-dimensional multiple coupling means associated with said array of detector elements for coupling each said detector element to a said separate amplifier-filter circuit, said multiple coupling means comprising, a set of multilayered boards of varying width stacked to form a structure with shelves and an essentially flat end surface, said end surface comprising an end of each said board, a substrate disposed on said end surface and having said detector array disposed thereupon, each said detector element being coupled between a common reference terminal and an individual signal terminal, multiple coupling terminals disposed on said shelves, and conductive means three-dimensionally associated with said boards for coupling said common terminal and each said signal terminal to a separate one of said coupling terminals.

8. The system as claimed in claim 5 further comprising three-dimensional multiple coupling means associated with said array of detector elements for coupling each said detector element to a said separate amplifier-filter circuit, said multiple coupling means comprising a set of wafers of varying size stacked to form a mesa structure with shelves, a substrate, having a top layer and at least first and second sublayers, disposed on said structure, said detector array being disposed on said top layer, multiple signal terminals and multiple bias terminals associated with said substrate, each said detector quadrant having one of said signal terminals and one of said bias terminals coupled to opposite ends thereof, first conductive means associated with said first sublayer for coupling together one half of said bias terminals, second conductive means associated with said secone sublayer for coupling together the other half of said bias terminals, multiple coupling terminals disposed on said shelves, and third conductive means three-dimensionally associated with said wafers for coupling said bias terminals and said signal terminals to said coupling terminals such that said one half of said bias terminals are coupled to a first of said coupling terminals, said other half of said bias terminals are coupled to a second of said coupling terminals, and each said four quadrants of each said detector are coupled to another of said coupling terminals.

9. The system as claimed in claim 5 further comprising three-dimensional multiple coupling means associated with said array of detector elements for coupling each said detector element to a said separate amplifier-filter circuit, said multiple coupling means comprising a set of multilayered boards of varying width stacked to form a structure with shelves and an essentially flat end surface, said end surface comprising an end of each said board, a substrate, having a top layer and at least first and second sublayers, disposed on said end surface, said detector array being disposed on said top layer, multiple signal terminals and multiple bias terminals associated with said substrate, each said detector quadrant having one of said signal terminals and one of said bias terminals coupled to opposite ends thereof, first conductive means associated with said first sublayer for coupling together one half of said bias terminals, second conductive means associated with said second sublayer for coupling together the other half of said bias terminals, multiple coupling terminals disposed on said shelves, and third conductive means three-dimensionally associated with said boards for coupling said bias terminals and said signal terminals to said coupling terminals such that said one half of said bias terminals are coupled to a first of said coupling terminals, said other half of said bias terminals are coupled to a second of said coupling terminals, and each said four quadrants of each said detector are coupled to another of said coupling terminals.

10. The system as claimed in claim 3 wherein said multiplex means comprises a set of first multiplexing means each coupled with the output circuits of the circuit means for sequentially multiplexing the signals from the circuit means, and a second set of multiplexing means each coupled to several of said first multiplexing means for further multiplexing signals therefrom.

11. The system as claimed in claim 4 wherein said digitizing means comprises an analog-to-digital converter coupled to said sampling means for digitizing said sampled signals, and said storage means and said combining and comparator means of said processor means form event determining means for determining the occurrence of features sensed by said detector elements.

12. The system as claimed in claim 11 wherein said serially connected storage means comprises a first shift register coupled to said analog-to-digital converter for registering a first sampled signal representing an output from a group of detector elements, and a second shift register coupled in series to said first shift register for delayed registration of said first sampled signal as a second sampled signal originating from the same group of detector elements as said first sampled signal registered in said first shift register, and said differencer means is coupled in parallel to said first and second shift registers for measuring the signal variation between said first and second sampled signals and said comparator means is coupled to said differencer means for comparing said signal variation with said threshold signal.

* * * * *